United States Patent
Ni et al.

(10) Patent No.: US 9,631,069 B1
(45) Date of Patent: Apr. 25, 2017

(54) POLY (CYCLIC BUTYLENE TEREPHTHALATE) / SILICON DIOXIDE NANOCOMPOSITE

(71) Applicant: ZHEJIANG SCI-TECH UNIVERSITY, Hangzhou (CN)

(72) Inventors: Qingqing Ni, Hangzhou (CN); Hong Xia, Hangzhou (CN); Yaqin Fu, Hangzhou (CN)

(73) Assignee: ZHEJIANG SCI-TECH UNIVERSITY, Hangzhou (CN)

( * ) Notice: Subject to any disclaimer, the term of this patent is extended or adjusted under 35 U.S.C. 154(b) by 0 days.

(21) Appl. No.: 14/979,423

(22) Filed: Dec. 27, 2015

(51) Int. Cl.
| | |
|---|---|
| *B01J 23/14* | (2006.01) |
| *B01J 21/08* | (2006.01) |
| *C08L 67/02* | (2006.01) |
| *C08K 9/04* | (2006.01) |
| *C08G 63/127* | (2006.01) |
| *C08G 63/85* | (2006.01) |
| *C08K 3/36* | (2006.01) |
| *C08G 63/183* | (2006.01) |
| *C08K 9/06* | (2006.01) |
| *B01J 27/135* | (2006.01) |

(52) U.S. Cl.
CPC ............. *C08K 9/04* (2013.01); *B01J 21/08* (2013.01); *B01J 23/14* (2013.01); *B01J 27/135* (2013.01); *C08G 63/127* (2013.01); *C08G 63/183* (2013.01); *C08G 63/85* (2013.01); *C08K 3/36* (2013.01); *C08K 9/06* (2013.01); *C08K 2201/011* (2013.01); *C08L 67/02* (2013.01)

(58) Field of Classification Search
None
See application file for complete search history.

(56) References Cited

U.S. PATENT DOCUMENTS

| | | | | |
|---|---|---|---|---|
| 5,965,265 | A * | 10/1999 | House ............... | B01D 15/3833 428/405 |
| 6,512,035 | B1 * | 1/2003 | Hergenrother ....... | B60C 1/0016 152/209.1 |
| 2010/0206797 | A1 * | 8/2010 | Chen ................ | B01J 20/28004 210/263 |

* cited by examiner

*Primary Examiner* — Richard A Huhn
(74) *Attorney, Agent, or Firm* — Global IP Services; Tianhua Gu

(57) ABSTRACT

The present invention relates to the technical field of polymer composites, in particular to a poly (cyclic butylene terephthalate)/silicon dioxide nanocomposite, wherein the added silicon dioxide is catalyst-modified nanosilicon dioxide.

7 Claims, No Drawings

POLY (CYCLIC BUTYLENE TEREPHTHALATE) / SILICON DIOXIDE NANOCOMPOSITE

TECHNICAL FIELD OF THE INVENTION

The present invention relates to the technical field of polymer composites, in particular to a poly (cyclic butylene terephthalate)/silicon dioxide nanocomposite.

BACKGROUND OF THE INVENTION

As a composite matrix resin having high fluidity, high wettability and high filling capability, cyclic butylene terephthalate (CBT) oligomer is a cyclic oligomer composed of dimers to heptamers. Due to its low melt viscosity (24 mPa·s, 190° C.), the CBT may quickly wet various reinforcers after melted. By adding a catalyst, poly(butylene terephthalate) (PBT, where the poly(butylene terephthalate obtained by polymerizing CBT is marked as pCBT for distinguishing from the conventional PBT) having a high molecular weight may be obtained by ring-opening polymerization at a temperature lower than the melting point of the resulting product. The reaction is easily controllable, has no release of small-molecular by-products and no generation of reaction heat, and may provide for quick shaping. As the only industrialized aryl cyclic oligoester at present, the CBT is highly representative and has attracted the common attention from both industry and academia. However, the CBT is usually crystallized while being polymerized during a polymerization reaction and there are no knots between molecules, so the pCBT is highly brittle and insufficient in comprehensive mechanical properties.

Due to its large specific surface, low cost, no toxicity, good environmental compatibility and high temperature resistance and other excellent characterstics, nanosilicon dioxide ($SiO_2$) is regarded as excellent reinforcing material. Given that nanosilicon dioxide is high in surface energy and very easy to be agglomerated, it is difficult by a common blending method to achieve the uniform dispersion in nanoscale and the excellent interface adhesion between nanosilicon dioxide particles and polymer matrix material, therefore, during preparing a silicon dioxide nanocomposite, it is required to perform surface modification to improve the interface compatibility of nanosilicon dioxide particles with the matrix and the dispersibility of nanosilicon dioxide particles in the matrix. This is the key to realize the reinforcing and toughening of matrix material by nanosilicon dioxide particles.

SUMMARY OF THE INVENTION

An objective of the present invention is to provide a poly (cyclic butylene terephthalate)/silicon dioxide nanocomposite having high toughness. Catalyst-modified nanosilicon dioxide is prepared. Specifically, first, the agglomeration of nanosilicon dioxide is broken by a surfactant, and then, the surface of the nanosilicon dioxide is then subjected to modification by a silane coupling agent and finally to graft modification by a catalyst. The catalyst-modified nanosilicon dioxide may not only directly serve as a filler of poly (cyclic butylene terephthalate), but also serve as a catalyst of the reaction while serving as the filler. Therefore, the addition of the catalyst-modified nanosilicon dioxide facilitates the improvement of the toughness and processability of composites, and is more environmentally friendly.

By intensive studies, the inventor(s) obtains the catalyst-modified nanosilicon dioxide by a certain modification method, and then obtain the poly (cyclic butylene terephthalate)/silicon dioxide nanocomposite having high toughness by a conventional composite preparation method.

The present invention provides a poly (cyclic butylene terephthalate)/silicon dioxide nanocomposite, wherein the added silicon dioxide is catalyst-modified nanosilicon dioxide having the following molecular structure:

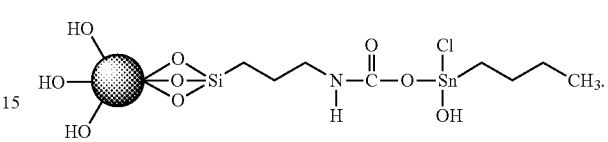

A method for preparing the catalyst-modified nanosilicon dioxide is specifically as follows:

step (1): mixing nanosilicon dioxide with a cationic surfactant in an organic solvent to form a uniformly dispersed mixed solution;

step (2): adding an isocyanate silane coupling agent into the mixed solution obtained in step (1), and reacting to obtain isocyanate silane coupling agent-modified nanosilicon dioxide; and step (3): reacting the isocyanate silane coupling agent-modified nanosilicon dioxide obtained in step (2) with a catalyst to obtain the catalyst-modified nanosilicon dioxide.

Compared with the prior art, the present invention has the following advantages:

the synthesis method designed in the present invention is rational, and the obtained catalyst-modified nanosilicon dioxide particles have an excellent dispersibility, and the poly (cyclic butylene terephthalate)/silicon dioxide nanocomposite prepared by the present invention has an excellent toughness.

DETAILED DESCRIPTION OF THE INVENTION

The present invention will be described below in detail.

The present invention provides a poly (cyclic butylene terephthalate)/silicon dioxide nanocomposite, wherein the added silicon dioxide is catalyst-modified nanosilicon dioxide having the following molecular structure:

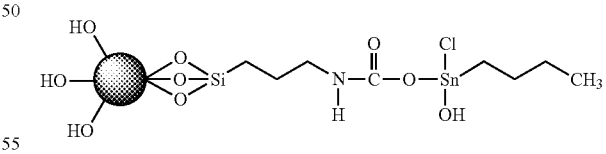

where, in the left half, what is connected to three hydroxyls is silicon dioxide, and it can be seen that the silicon dioxide is grafted with hydroxyls and a modification group.

In the poly (cyclic butylene terephthalate)/silicon dioxide nanocomposite provided by the present invention, with respect to 100 parts by mass of poly (cyclic butylene terephthalate), the addition amount of the catalyst-modified nanosilicon dioxide is 1 to 50 parts by mass, preferably 2 to 20 parts by mass.

A method for preparing the catalyst-modified nanosilicon dioxide in the present invention includes the following steps.

Step (1): Nanosilicon dioxide and a cationic surfactant are dispersed in an organic solvent to obtain a uniformly dispersed mixed solution;

Step (2): An isocyanate silane coupling agent is added into the mixed solution obtained in step (1), and then reacted to obtain isocyanate silane coupling agent-modified nanosilicon dioxide; and Step (3): The isocyanate silane coupling agent-modified nanosilicon dioxide obtained in step (2) is reacted with a catalyst to obtain the catalyst-modified nanosilicon dioxide.

Step (1): Nanosilicon dioxide and a cationic surfactant are dispersed in an organic solvent to obtain a uniformly dispersed mixed solution.

A certain amount of the cationic surfactant is added into a proper amount of the organic solvent, and then stirred for 10 min to 60 min at 50° C. to 70° C. at an electromagnetic stirring speed of 400 r/min to 600 r/min to obtain a mixed solution. Then, a certain amount of nanosilicon dioxide is added into the mixed solution and then ultrasonically treated for 0.5 h to 2 h to obtain a uniformly dispersed nanosilicon dioxide mixed solution.

The nanosilicon dioxide used in step (1) is nanosilicon dioxide having hydroxyls on its surface and having a particle size of 10 nm to 100 nm.

The cationic surfactant used in step (1) is a mixture of one or more of alkyl trimethyl ammonium salt, dialkyl dimethyl ammonium salt and alkyl dimethyl benzyl ammonium salt among quaternary ammonium salt cationic surfactants. With respect to 100 parts by mass of nanosilicon dioxide, the addition amount of the cationic surfactant was 5 to 30 parts by mass, preferably 10 to 25 parts by mass.

The organic solvent used in step (1) is a mixture of one or more of benzene, methylbenzene and dimethylbenzene.

Step (2): An isocyanate silane coupling agent is added into the mixed solution obtained in step (1), and then reacted to obtain isocyanate silane coupling agent-modified nanosilicon dioxide.

The mixed solution obtained by uniformly dispersing the nanosilicon dioxide in step (1) is transferred into a reflux condenser, a proper amount of isocyanate silane coupling agent is added dropwise under the protection of nitrogen, and the system is reacted for 6 h to 24 h at 70° C. to 90° C. at an electromagnetic stirring speed of 100 r/min to 300 r/min. At the end of reaction, the resulting product is centrifuged and washed to obtain the isocyanate silane coupling agent-modified nanosilicon dioxide.

The isocyanate silane coupling agent is a mixture of one or two of a triethoxy isocyanate silane coupling agent and a trimethoxy isocyanate silane coupling agent. With respect to 100 g of nanosilicon dioxide, the addition amount of the isocyanate silane coupling agent is 5 mL to 30 mL, preferably 10 mL to 20 mL.

Step (3): The isocyanate silane coupling agent-modified nanosilicon dioxide obtained in step (2) is reacted with a catalyst to obtain the catalyst-modified nanosilicon dioxide.

The isocyanate silane coupling agent-modified nanosilicon dioxide obtained in step (2) is uniformly dispersed into an organic solvent, a proper amount of catalyst is added under the protection of nitrogen at a magnetic stirring speed of 100 r/min to 300 r/min, and the system is reacted for 6 h to 8 h at 70° C. to 90° C. At the end of reaction, the resulting product is centrifuged and dried to obtain the catalyst-modified nanosilicon dioxide.

The catalyst is a tin catalyst or a titanium catalyst, preferably the tin catalyst considering the stability of the catalyst and the ease of acquisition in industry. The tin catalyst is a mixture of one or two of tin naphthene and butylchlorodihydroxytin among organic tin catalysts, preferably butylchlorodihydroxytin. With respect to 100 parts by mass of nanosilicon dioxide, the addition amount of the tin catalyst is 5 to 40 parts by mass, preferably 10 to 30 parts by mass.

A mixture of one or more of cerium acetate and cerium oxalate is added, with an addition amount of 3 to 5 parts by mass of the mixture with respect to 100 parts by mass of the silane coupling agent-modified nanosilicon dioxide, in the reaction of step (3). The addition of the mixture may improve the binding stability of the catalyst with the silicon dioxide and has no negative effects on the subsequent polymerization reaction.

Zirconocene dichloride is added in the reaction of step (3), with an addition amount of 5 to 8 parts by mass with respect to 100 parts by mass of the silane coupling agent-modified nanosilicon dioxide. The addition of zirconocene dichloride may not only quicken the reaction rate of the catalyst with the silicon dioxide, but also effectively improve the grafting ratio of the catalyst on the silicon dioxide.

The drying may be normal pressure drying, vacuum drying or the like.

The temperature for the drying is 50□ to 70□.

EMBODIMENTS

The solutions of the present invention will be described below in detail by the following embodiments.

Embodiment 1

10 g of tetraoctyl ammonium bromide was dispersed into 1500 mL of dimethylbenzene and then magnetically stirred for 20 min at an electromagnetic stirring speed of 500 r/min to obtain a solution A. 50 g of nanosilicon dioxide was added into the solution A and then ultrasonically treated for 1 h to obtain a uniformly dispersed mixed solution B.

The mixed solution B was transferred into a reflux condenser and then added dropwise with 10 mL of triethoxy isocyanate silane coupling agent under the protection of N2, and the system was reacted for 24 h in an oil bath at 80° C. At the end of reaction, the resulting product was separated and washed with dimethylbenzene for multiple times to obtain grafting silane coupling agent-modified nanosilicon dioxide.

The modified nanosilicon dioxide was ultrasonically dispersed into dimenthylbenzene again, then magnetically stirred under the protection of N2 and added with 15 g of catalyst, and the system was reacted for 6 h at 80° C. At the end of reaction, the resulting product was separated, washed with THF to remove the non-grafted catalyst and finally washed with ethyl alcohol. Then, the resulting product was dried for 12 h at 60° C. in a vacuum oven to obtain catalyst-modified nanosilicon dioxide.

Subsequently, the catalyst-modified nanosilicon dioxide was added into CBT to generate a pCBT nanocomposite by in-situ polymerization, and standard tension splines were manufactured by Harker micro-injection molding. The splines were subjected to tension tests by a universal testing machine to obtain a stress-strain curve, and then the toughness of the composite was obtained by curve integral. The fracture absorbing energy of the pCBT nanosilicon composite containing 2 wt % of catalyst-modified nanosilicon dioxide was 591 J, which was improved by about 60% in terms of toughening effect in comparison to 370 J of the pure pCBT composite.

Embodiment 2

The pCBT nanocomposite containing 5 wt % of catalyst-modified nanosilicon dioxide was prepared by using the catalyst-modified nanosilicon dioxide prepared in Embodiment 1. The fracture absorbing energy of this composite was 610 J, which was improved by about 65% in terms of toughening effect in comparison to 370 J of the pure pCBT composite.

Embodiment 3

12 g of tetraoctyl ammonium bromide was dispersed into 1500 mL of dimethylbenzene and then magnetically stirred for 20 min at an electromagnetic stirring speed of 500 r/min to obtain a solution A. 50 g of nanosilicon dioxide was added into the solution A and then ultrasonically treated for 1 h to obtain a uniformly dispersed mixed solution B.

The mixed solution B was transferred into a reflux condenser and then added dropwise with 15 mL of triethoxy isocyanate silane coupling agent under the protection of N2, and the system was reacted for 24 h in an oil bath at 80° C. At the end of reaction, the resulting product was separated and washed with dimethylbenzene for multiple times to obtain grafting silane coupling agent-modified nanosilicon dioxide.

The modified nanosilicon dioxide was ultrasonically dispersed into dimenthylbenzene again, then magnetically stirred under the protection of N2 and added with 15 g of catalyst, and the system was reacted for 6 h at 80° C. At the end of reaction, the resulting product was separated, washed with THF to remove the non-grafted catalyst and finally washed with ethyl alcohol. Then, the resulting product was dried for 12 h at 60° C. in a vacuum oven to obtain catalyst-modified nanosilicon dioxide.

Subsequently, the catalyst-modified nanosilicon dioxide was added into CBT to generate a pCBT nanocomposite by in-situ polymerization, and standard tension splines were manufactured by Harker micro-injection molding. The splines were subjected to tension tests by a universal testing machine to obtain a stress-strain curve, and then the toughness of the composite was obtained by curve integral. The toughening effect of the pCBT nanosilicon composite containing 3 wt % of catalyst-modified nanosilicon dioxide was improved by about 56% in comparison to the pure pCBT composite.

Embodiment 4

5 g of tetraoctyl ammonium bromide was dispersed into 1500 mL of dimethylbenzene and then magnetically stirred for 20 min at an electromagnetic stirring speed of 500 r/min to obtain a solution A. 50 g of nanosilicon dioxide was added into the solution A and then ultrasonically treated for 1 h to obtain a uniformly dispersed mixed solution B.

The mixed solution B was transferred into a reflux condenser and then added dropwise with 15 mL of triethoxy isocyanate silane coupling agent under the protection of N2, and the system was reacted for 24 h in an oil bath at 80° C. At the end of reaction, the resulting product was separated and washed with dimethylbenzene for multiple times to obtain grafting silane coupling agent-modified nanosilicon dioxide.

The modified nanosilicon dioxide was ultrasonically dispersed into dimenthylbenzene again, then magnetically stirred under the protection of N2 and added with 20 g of catalyst, 8 g of cerium acetate and 12 g of zirconocene dichloride, and the system was reacted for 6 h at 80° C. At the end of reaction, the resulting product was separated, washed with THF to remove the non-grafted catalyst and finally washed with ethyl alcohol. Then, the resulting product was dried for 12 h at 60° C. in a vacuum oven to obtain catalyst-modified nanosilicon dioxide.

Subsequently, the catalyst-modified nanosilicon dioxide was added into CBT to generate pCBT nanocomposite by in-situ polymerization, and standard tension splines were manufactured by Harker micro-injection molding. The splines were subjected to tension tests by a universal testing machine to obtain a stress-strain curve, and then the toughness of the composite was obtained by curve integral. The toughening effect of the pCBT nanosilicon composite containing 2 wt % of catalyst-modified nanosilicon dioxide was improved by about 62% in comparison to the pure pCBT composite.

What is claimed is:

1. A poly (cyclic butylene terephthalate)/silicon dioxide nanocomposite, characterized in that the added silicon dioxide is catalyst-modified nanosilicon dioxide having the following molecular structure:

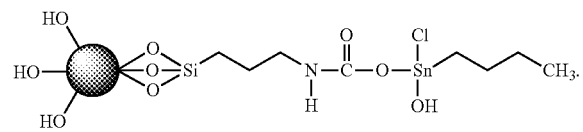

2. The poly (cyclic butylene terephthalate)/silicon dioxide nanocomposite according to claim 1, characterized in that a method for preparing the catalyst-modified nanosilicon dioxide is specifically as follows:
   step (1): mixing nanosilicon dioxide with a cationic surfactant in an organic solvent to form a uniformly dispersed mixed solution;
   step (2): adding an isocyanate silane coupling agent into the mixed solution obtained in step (1), and reacting to obtain isocyanate silane coupling agent-modified nanosilicon dioxide; and
   step (3): reacting the isocyanate silane coupling agent-modified nanosilicon dioxide obtained in step (2) with a catalyst to obtain the catalyst-modified nanosilicon dioxide.

3. The poly (cyclic butylene terephthalate)/silicon dioxide nanocomposite according to claim 2, characterized in that the method for preparing the catalyst-modified nanosilicon dioxide is specifically as follows:
   step (1): dispersing 5 g to 12 g of tetraoctyl ammonium bromide into 1500 mL of dimethylbenzene, magnetically stirring for 20 min at an electromagnetic stirring speed of 500 r/min to obtain a solution A, adding 50 g of nanosilicon dioxide into the solution A, and ultrasonically treating for 1 h to obtain a uniformly dispersed mixed solution B;
   step (2): transferring the mixed solution B into a reflux condenser, adding dropwise 15 mL of triethoxy isocyanate silane coupling agent under the protection of $N_2$, reacting for 24 h in an oil bath at 80° C., separating the resulting product at the end of reaction, and washing with dimethylbenzene to obtain the silane coupling agent-modified nanosilicon dioxide; and
   step (3): ultrasonically dispersing the modified nanosilicon dioxide into dimethylbenzene again, magnetically stirring under the protection of $N_2$, adding 15 g of catalyst, reacting for 6 h at 80° C., separating the resulting product at the end of reaction, washing with THF to remove the non-grafted catalyst, finally washing the resulting product with ethyl alcohol and drying for 12 h at 60° C. in a vacuum oven to obtain the catalyst-modified nanosilicon dioxide.

4. The poly (cyclic butylene terephthalate)/silicon dioxide nanocomposite according to claim 2, characterized in that the catalyst is butylchlorodihydroxytin.

5. The poly (cyclic butylene terephthalate)/silicon dioxide nanocomposite according to claim 2, characterized in that a mixture of one or more of cerium acetate and cerium oxalate is added, with an addition amount of 3 to 5 parts by mass of the mixture with respect to 100 parts by mass of the silane coupling agent-modified nanosilicon dioxide, in the reaction of step (3).

6. The poly (cyclic butylene terephthalate)/silicon dioxide nanocomposite according to claim 3, characterized in that the catalyst is butylchlorodihydroxytin.

7. The poly (cyclic butylene terephthalate)/silicon dioxide nanocomposite according to claim 3, characterized in that a mixture of one or more of cerium acetate and cerium oxalate is added, with an addition amount of 3 to 5 parts by mass of the mixture with respect to 100 parts by mass of the silane coupling agent-modified nanosilicon dioxide, in the reaction of step (3).

\* \* \* \* \*